United States Patent [19]

Schafer

[11] Patent Number: 4,962,730

[45] Date of Patent: Oct. 16, 1990

[54] ANIMAL DRINKER

[76] Inventor: Kenneth L. Schafer, Rte. 3 Box 73, LeSueur, Minn. 56058

[21] Appl. No.: 467,207

[22] Filed: Jan. 19, 1990

Related U.S. Application Data

[63] Continuation-in-part of Ser. No. 394,853, Aug. 17, 1984.

[51] Int. Cl.$^5$ .............................................. A01K 7/06
[52] U.S. Cl. ....................................... 119/73; 119/74
[58] Field of Search ....................... 119/72, 73, 74, 78; D30/132, 131

[56] References Cited

U.S. PATENT DOCUMENTS

| | | |
|---|---|---|
| 4,100,885 | 7/1978 | Kapplinger ............................ 119/73 |
| 4,343,264 | 8/1982 | Schafer et al. ......................... 119/73 |
| 4,395,974 | 8/1983 | Schafer et al. ......................... 119/73 |
| 4,559,905 | 12/1985 | Ahreus .................................. 119/73 |
| 4,708,091 | 11/1987 | Schafer ................................. 119/73 |
| 4,744,332 | 5/1988 | Ahreus .................................. 119/73 |
| 4,785,767 | 11/1988 | Ryder ................................... 119/73 |

Primary Examiner—John Weiss
Attorney, Agent, or Firm—Burd, Bartz & Gutenkauf

[57] ABSTRACT

An animal watering drinker has a tank having end walls with drinking well pockets. A top wall unit mounted on the tank has a continuous baffle surrounding a float valve assembly and bosses closing the backs of the pockets. Lids pivotally mounted on the top wall unit normally close the tops of the drinking well pockets.

16 Claims, 5 Drawing Sheets

ANIMAL DRINKER

CROSS REFERENCE TO RELATED APPLICATION

This application is a continuation-in-part of U.S. application Ser. No. 394,853 filed Aug. 17, 1989.

FIELD OF INVENTION

The invention pertains to water drinkers for providing an outdoor source of drinking water for animals. The water drinkers have insulated tanks and tops with movable lids to prevent freezing of water within the tanks in cold environmental conditions.

BACKGROUND OF INVENTION

Stock drinkers have been constructed with tanks insulated with foam or other insulated materials for keeping the water from freezing during the winter months and cool during the summer months. Examples of aminal drinkers having foam plastic insulated walls are shown by Martin in U.S. Pat. No. 3,745,977; Kapplinger in U.S. Pat. No. 4,100,885; and Schafer et al in U.S. Pat. Nos. 4,343,264 and 4,395,974. These animal drinkers have inner and outer plastic walls reinforced with glass fibers. The walls are separately made and secured together. Foam plastic is then injected into the space between the inner and outer walls. This manufacturing procedure is labor intensive and expensive.

Tank-type watering devices have drinking wells closed with a movable covers or lids. The animal raises a lid to provide access to the water in the drinking well. Float valve assemblies are used to automatically maintain the level of the water in the tank. The float valve assemblies are isolated from the drinking wells with baffles that extend downwardly from the inside of the top wall of the watering devices into the water therein. The baffles extend transversely between the side walls of the tank. The baffles act as guides for directing convection circulation of water in the tank.

SUMMARY OF INVENTION

The invention is directed to an animal watering apparatus or drinker for animals such as hogs, cattle, sheep, horses and the like. The drinker has a tank having heat insulated walls of plastic foam insulation sandwiched between seamless plastic shells made by a rotational molding process. The tank has an end wall with a drinking well pocket open to the chamber of the tank and the top of the end wall. A top wall unit having heat insulated walls of foam plastic insulation sandwiched between seamless plastic shells closes the top of the chamber of the tank. The top wall unit is made by a rotational mold process. The top wall unit has downwardly directed continuous baffle extended into the chamber and spaced inwardly from the upright walls of the tank and above the bottom wall so that water is located between the baffle and the upright wall means of the tank. The baffle has a bottom edge located below the normal level of the water in the chamber and a boss extended into the drinking well pocket. The boss closes the back of the pocket and prevents air from flowing into the chamber. A float valve assembly is located within the chamber below the top wall unit. The float valve assembly is connected to a water supply pipe extended upwardly through a tube connected to the bottom wall of the tank. The float valve assembly operates to maintain a selected level of water in the chamber and drinking well pocket. A lid pivotally mounted on the top wall unit normally closes the top of the drinking well pocket. An animal moves the lid to an open position to provide access to the water in the drinking well pocket. The lid will return to its closed position when the animal moves away from the drinking well pocket. The insulation of the tank and top wall unit and the normal circulation of the water within the chamber and drinking well pocket prevents the freezing of the water in the cold weather environments without the use of an outside energy such as heaters.

A preferred embodiment of the drinker has a tank with generally upright side walls joined to a horizontal bottom wall and upright end walls surrounding a chamber for accommodating water. The end walls have drinking well pockets open to the chamber and the top of the end walls. Each end wall has first and second inside walls laterally spaced from each other on opposite sides of the drinking well pocket. The tank has seamless inner and outer plastic shells made by rotational molding process. The space between the shells is filled with heat or temperature insulation material, such as urethane or like foam plastic to insulate the tank. A top wall unit is mounted on the side walls and the end walls to cover the chamber. The top wall unit has a downwardly directed continuous baffle containing insulation material that extends into the chamber and is spaced inwardly from the upright side walls and above the bottom wall so that water is located between the baffle and the upright side walls and in the pockets. The baffle has a bottom edge that is located below the normal level of the water in the chamber. Bosses on the top wall unit extend into the drinking well pockets to provide the back walls for the drinking well pockets. The bosses have upright surfaces located in surface engagement with the first and second inside walls of the end walls to block the flow of air from the pockets into the chamber. The top unit has an enclosed space accommodating a float valve assembly operable to maintain a level of water in the chamber and pockets. The float valve assembly is mounted on an upright pipe extended through a tube connected to the bottom wall of the tank. A plurality of fasteners releasably connect the top wall unit to the tank. Lids extend over the top of the end walls to close the top of the drinking well pockets. Hinges pivotally connect the lids to the top wall unit so that an animal can lift the lid and drink water from the drinking well pockets. When the animal leaves the drinker the lids will automatically return to their closed positions over the top of the drinking well pockets.

DESCRIPTION OF PREFERRED EMBODIMENT

Figure 1:
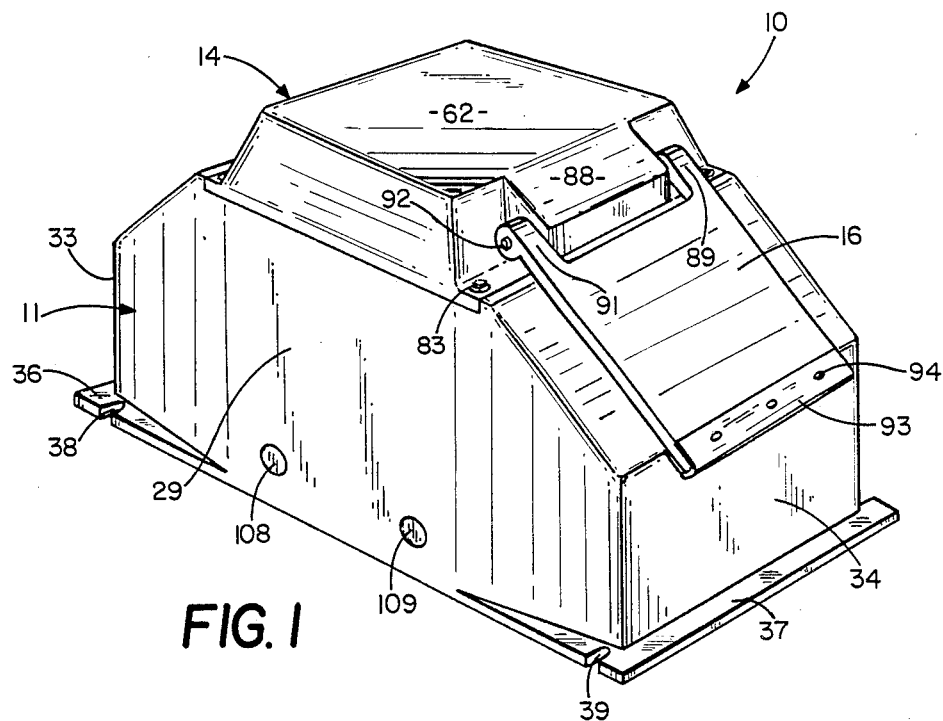
FIG. 1 is a perspective view of the animal drinker of the invention.

Referring to the drawing, there is shown an animal watering apparatus or drinker indicated generally at 10 used to provide fresh water for animals, such as cattle, hogs, sheep, horses and the like in an outdoor environment under cold weather conditions. Animal drinker 10 has a generally rectangular open top tank indicated generally at 11 having an internal chamber 12 for accommodating a supply of water 13. The top of tank 11 is closed with a top unit indicated generally at 14. Top unit 14 supports lids 16 and 17 that normally close drinking well pockets 18 and 19 in opposite ends of tank 11. The animals lift lids 16 and 17 to provide access to the water in drinking well pockets 18 and 19.

Drinker 10 is supported on a concrete slab 21 or floor in the feed lot. An underground water pipe 22 extends upwardly through slab 21 and the bottom of tank 11 into chamber 12. A upright tube 23 has a lower end threaded into a threaded hole 24 in the bottom of tank 11. Water pipe 22 extends upwardly through tube 23. The upper end of pipe 22 is connected to a float valve assembly 26 located under top unit 14 for controlling the supply of water to chamber 12 and drinking well pockets 18 and 19. Float valve assembly 26 has an arm 27 connected at its outer end to a float 28 which rests on the surface of water 13. As the level of water 13 drops below a preselected level, float 28 moves downwardly with arm 27 to open valve 26 so that water is discharged into chamber 12. As the water level rises float 28 moves upwardly to close valve 26 and thereby regulate the level of water 13 in chamber 12 below float valve assembly 26. Float valve assembly 26 can be any of the usual float valves used in tanks to control the level of water in the tanks. Examples of float valves are shown by Barker et al in U.S. Pat. No. 3,835,882 and Schafer et al in U.S. Pat. No. 4,395,974.

Tank 11 has generally upright side walls 29 and 31 joined to a horizontal bottom wall 32. Upright end walls 33 and 34 complete the tank. The lower portions of end walls 33 and 34 have outwardly directed flanges 36 and 37 provided with side notches 38 and 39 for accommodating fasteners for securing the drinker to slab 21. The walls of tank 11 have an outer shell 41 and an inner shell 42. The space between the inner and outer shells 41 and 42 is filled with a temperature insulation core 43, such as foam plastic including but not limited to urethane, polystyrene foam and the like. The inner and outer shells 41 and 42 and flanges 36 and 37 are a one piece seamless unit made by a a rotational molding process. The insulation core 43 is introduced into the space between shells 41 and 42 after the molding process has been completed. The core plastic material, such as urethane foam, reacts within the space to fill the entire space with foamed plastic. The seamless double wall construction of the tank prevents water leakage and provides strength and durability to the entire tank.

Figure 8:
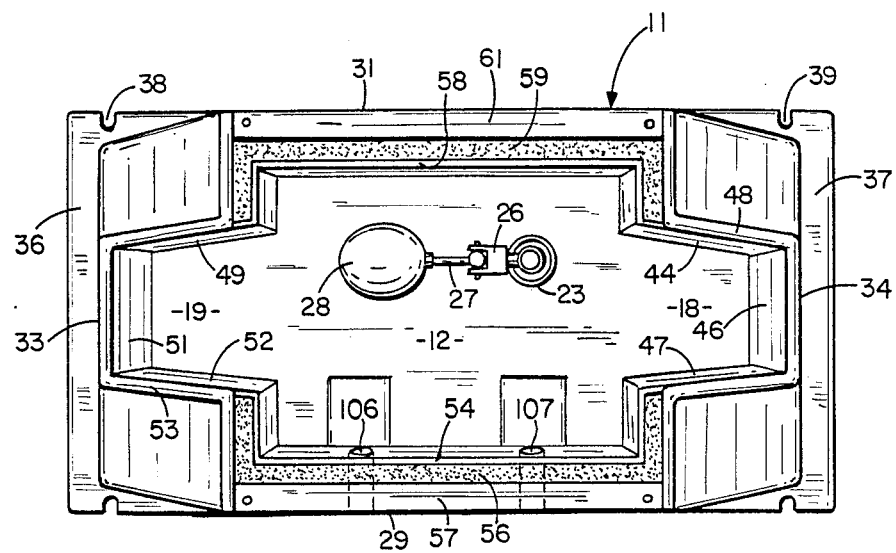
FIG. 8 is a top view of the tank of the animal drinker of FIG. 1.

As shown in FIG. 8, end wall 34 has an upright inside walls 44, 46, and 47 forming drinking well pocket 18. Walls 44, 46, and 47 have an upper generally U-shaped lip 48 that extends upwardly and inwardly adjacent the upper front and sides of drinking well pocket 18. The opposite end 33 of tank 11 has inside walls 49, 51 and 52 forming drinking well pocket 19. The upper portions of walls 49, 50 and 52 have a U-shaped lip 53 that extends upwardly and inwardly toward top unit 14.

Figure 5:
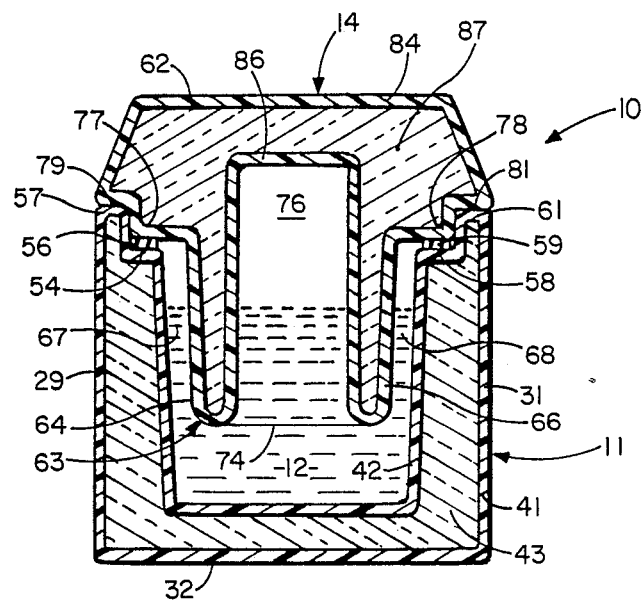
FIG. 5 is a sectional view taken along the line 5—5 of FIG. 2.
Figure 6:
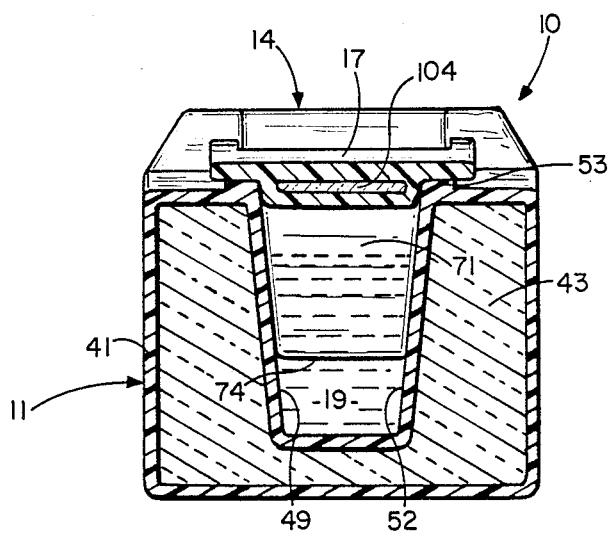
FIG. 6 is a sectional view taken along line 6—6 of FIG. 4.
Figure 7:
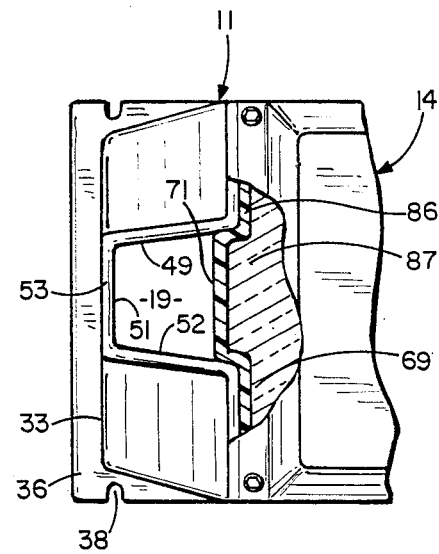
FIG. 7 is a sectional view taken along line 7—7 of FIG. 4.

As shown in FIGS. 5 and 7, side wall 29 has a upper inwardly directed shoulder 54 supporting a seal 56. An upwardly directed rib 57 is located outwardly of shoulder 54. Shoulder 54 and rib 57 have opposite transverse ends that extend to lips 48 and 53. Side wall 31 has an inwardly directed shoulder 58 supporting a seal 58. An upwardly directed rib 61 located outwardly of shoulder 58. Opposite transverse ends of shoulder 58 and rib 61 are joined to ends of lips 48 and 53.

Top unit 14 has a top wall 62 closing the top of tank 11. Top wall 62 has a downwardly directed generally rectangular baffle indicated generally at 63, surrounding an enclosed space 76 for accommodating float valve assembly 26. Baffle 63 has generally parallel side baffle walls or members 64 and 66, as shown in FIG. 5, spaced inwardly from the inside shell 42 of tank 11. The spaces 67 and 68 between baffle members 64 and 66 and the inner surfaces of side walls 29 and 31 of tank 11 accommodate air and water which provides additional insulation for the water below space 76 and float valve assembly 26. Small holes 75 in baffle 63 located above the high or full water level allow air to flow into and out of space 76.

Figure 4:
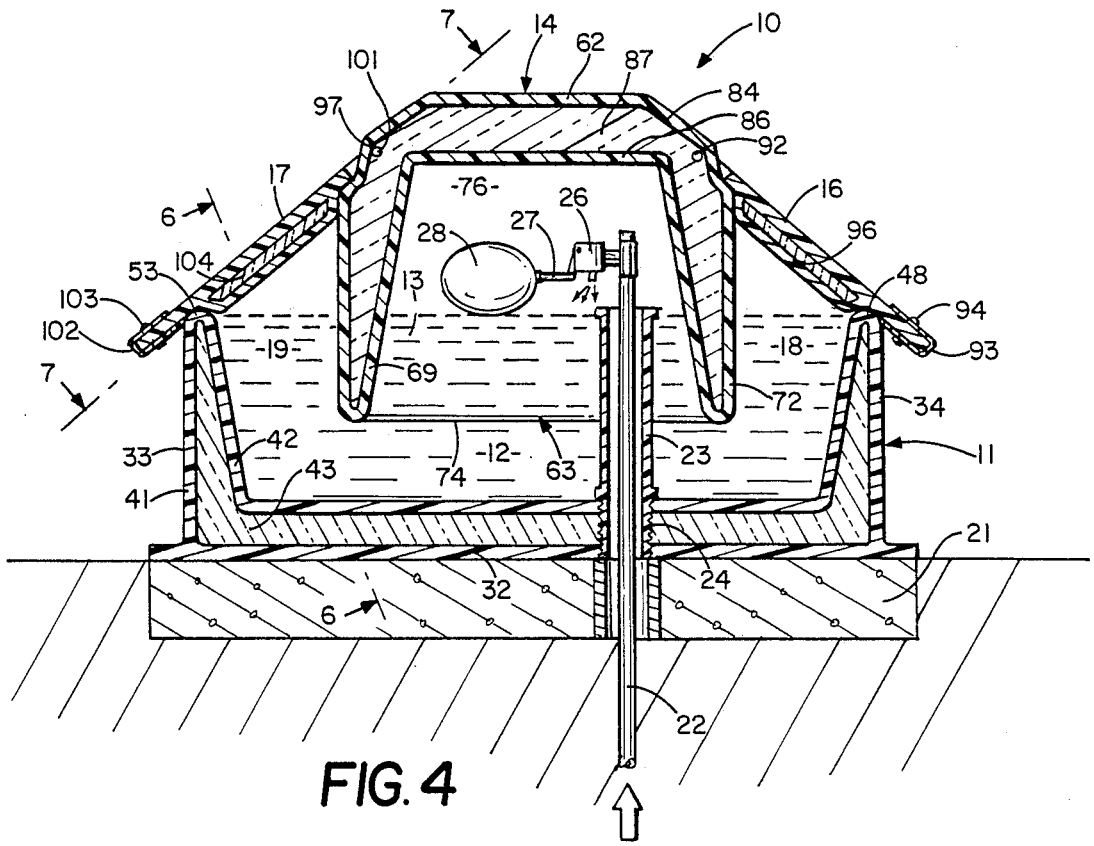
FIG. 4 is a sectional view taken along line 4—4 of FIG. 2.
Figure 9:
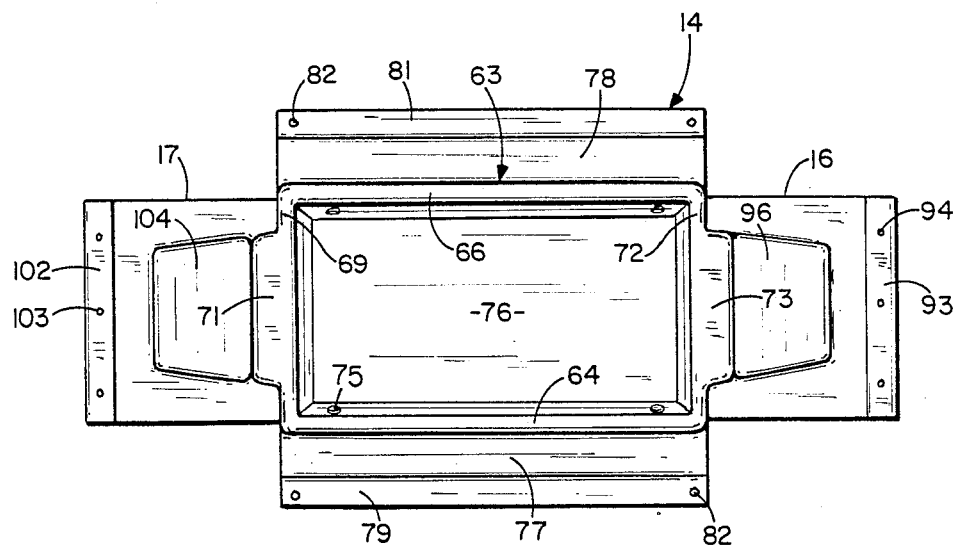
FIG. 9 is a bottom view of the cover and lids of the animal drinker of FIG. 1.

Referring to FIG. 4, baffle 63 has end baffle members 69 and 72 that extend across the back of drinking well pockets 18 and 19. End baffle member 69 has a generally rectangular boss 71 that extends into drinking well pocket 19. As seen in FIG. 7, boss 71 extends into drinking well pocket 19 forming the back wall of drinking well pocket 19. Opposite sides of boss 71 are located in engagement with inside walls 49 and 52 to prevent air from flowing into spaces 67 and 68 adjacent side walls 64 and 66 of baffle 63 and thereby maintain the temperature insulating characterisics of the air and water in spaces 67 and 68. As seen in FIG. 9, end baffle member 72 has an outwardly directed boss 73. Boss 73 extends into drinking well pocket 18 to close the rear of drinking well pocket 18 and providing a back wall for the pocket. The opposite sides of boss 73 engage the inside walls 44 and 47 to prevent air from flowing into spaces 67 and 68 to maintain the insulation features of the air and water in spaces 67 and 68. Bosses 71 and 73 also position top unit 14 on tank 11. Top unit 14 is keyed onto tank 11 with bosses 71 and 73.

Baffle 63 has a continuous generally rectangular lower edge 74 located above bottom wall 32 so that water can circulate under baffle 63 from chamber 12 into drinking well pockets 18 and 19. Top unit 14 has a first inside section 77 that rests on seal 56 and a second inside section 78 that rests on seal 59. Outwardly directed side edges 79 and 81 joined to sections 77 and 78 respectively rest on the tops of rid 57 and 61 of side walls 29 and 31. A plurality of bolts 83 extended through holes 82 secure top unit 14 to tank 11. Bolts 83 hold the inside sections 77 and 78 in a tight sealing relation with seals 56 and 59 to minimize the loss of heat from the water in chamber 12 and the entrance of cold outside air into the interior of the drinker.

Top unit 14 is a seamless one piece structure having an outside shell 84 and an inside shell 86. A temperature or heat insulation core 87, such as urethane or polystyrene foam and the like, is located between shells 84 and 86. Shells 84 and 86 are rotationally molded as a one piece unit. The temperature insulation core 87, such as urethane foam, is injected into the space between shells 84 and 86 to complete top unit 14. The entire space between shells 84 and 86 is filled with the foam plastic of insulation core 87.

Figure 2:
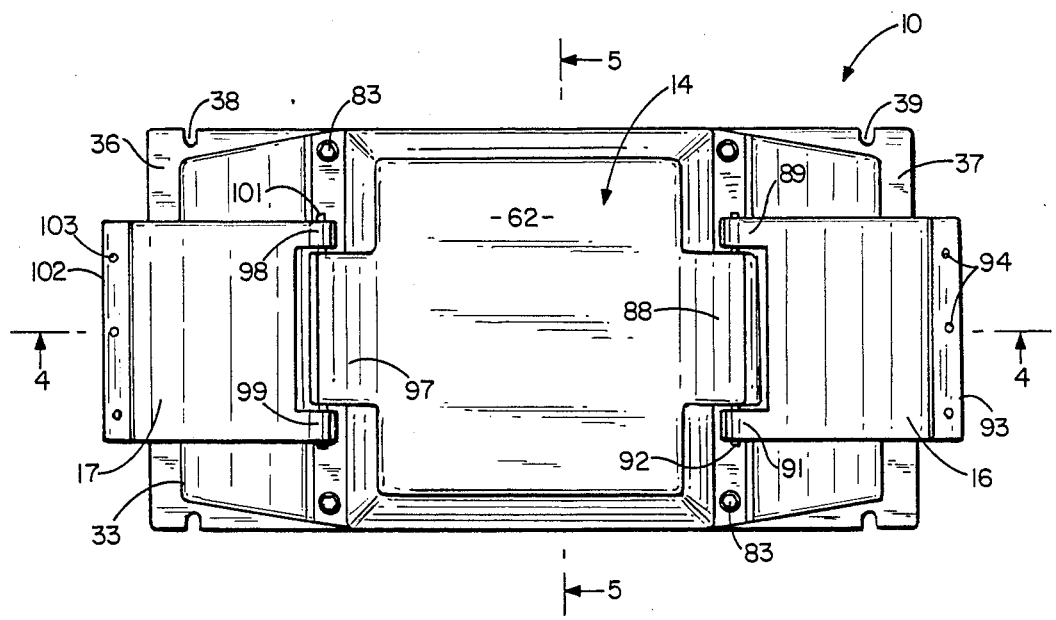
FIG. 2 is a top plan view of the animal drinker of FIG. 1.
Figure 3:
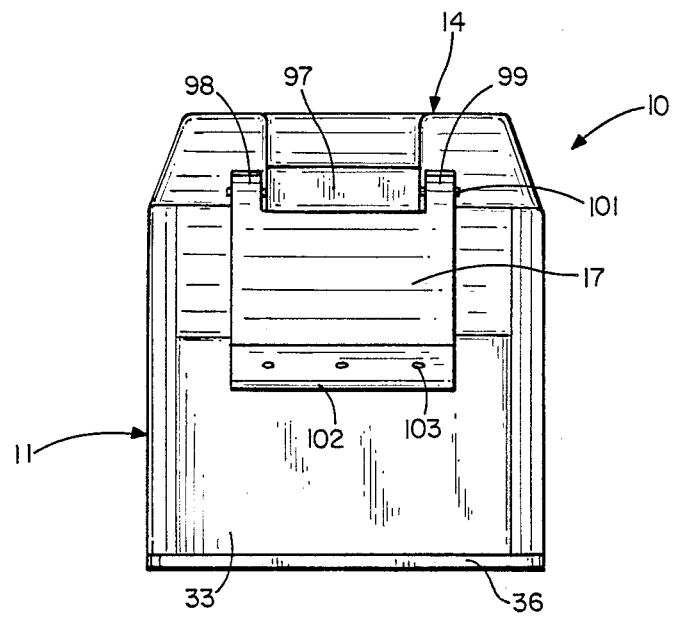
FIG. 3 is an end elevational view of the left end of the animal drinker of FIG. 1.

Referring to FIG. 2, top unit 14 has a generally rectangular first extension 88 located between inwardly directed ears 89 and 91 of lid 16. A transverse pivot rod 92 pivotally connects ears 89 and 91 to extension 88 so that lid 16 can be moved upwardly to open the top of drinking well pocket 18. The upper edge of lid 16 engages the top of extension 88 when lid 16 is open to prevent lid 16 from falling back unto top wall 62. The outer edge of lid 16 projects outwardly from end wall 34 and supports a generally U-shaped member 93, such as a metal channel, to protect lid 16 from the animals. A plurality of fasteners 94, such as rivets, bolts and the like, secure member 93 to lid 16. As seen in FIG. 4, lid 16 has an enlarged downwardly directed bottom section 96 which contains temperature insulation material that fits into the top of drinking well pocket 18 to reduce heat loss of the water in the drinking well pockets.

Top unit 14, as seen in FIG. 2, has a second outwardly directed extension 97 opposite extension 88 located between ears 98 and 99 of lid 17. A transverse pivot rod 101 pivotally connects lid 17 to extension 97. The upper edge of lid 17 engages the top of extension 97 when lid 17 is open to prevent lid 17 from falling back unto top wall 62. The outer lower edge of lid 17 has a transverse U-shaped member 102, such as a metal channel, located about the end of lid 17 which projects outwardly from end wall 33. A plurality of fasteners 103 secure member 102 to lid 17. As seen in FIG. 4, lid 17 has a downwardly directed enlarged bottom section 104 that extends into the top of drinking well pocket 19 to reduce the heat loss of the water from drinking well pocket 19.

Water is drained from chamber 12 through drain holes 106 and 107 in the bottom of side wall 29 shown in broken lines in FIG. 8. Returning to FIG. 1, removeable plugs 108 and 109 fit into holes 106 and 107 to retain water in chamber 12.

Figure 10:
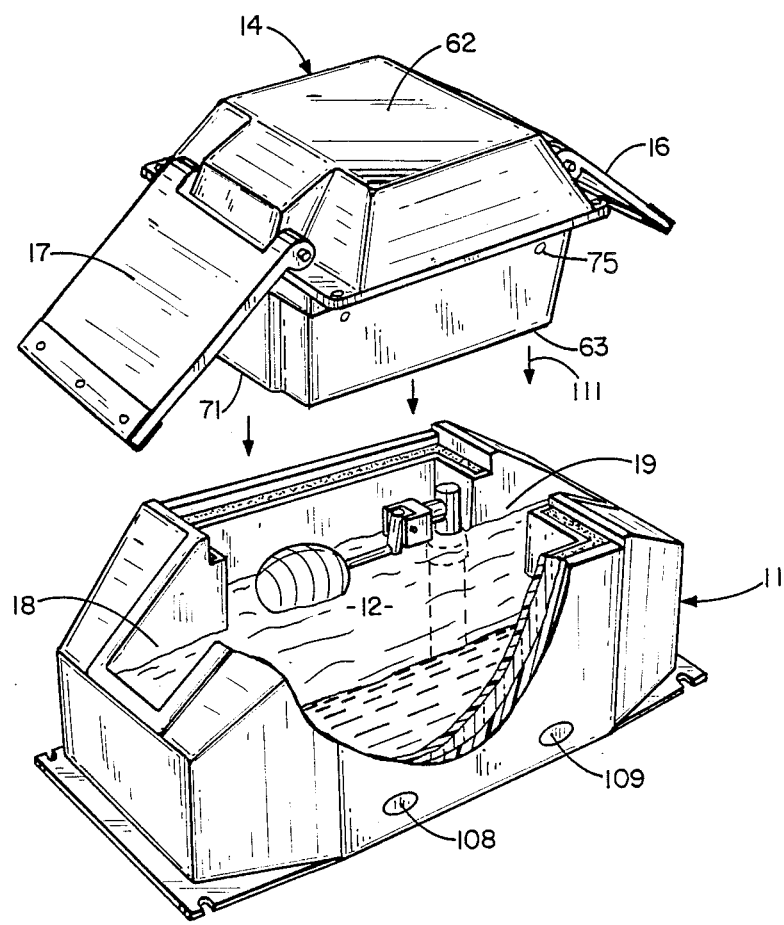
FIG. 10 is an exploded perspective view of the tank, cover and lids of the animal drinker of FIG. 1.

Tank 11 and top unit 14 are separate seamless one-piece units that are made by a rotational mold process and are subsequently filled with an insulated material, such as foam plastic. Lids 16 and 17 are pivotally mounted on extensions 88 and 97 with pivot rods 92 and 101. As shown in FIG. 10, top unit 14 is assembled onto tank 11 by moving the top unit down as indicated by the arrows 111 into the chamber 12 to enclose the float valve assembly 26 within the space 76 under top unit 14. Baffle 63 extends downwardly into chamber 12 with the bottom wall 74 thereof spaced above the bottom wall 32 of the tank. The baffle side walls 64 and 66 are laterally spaced from the adjacent walls of the tank so that water is free to circulate around the outside of baffle 63 to minimize heat loss from the water within chamber 12. As shown in FIG. 4, tube 23 functions as a water overflow pipe as well as a passage for accommodating water inlet pipe 22. Air can flow through holes 75 in baffle 63 and also flow through pipe 23 into and out of space 76 during the time that the water level in chamber 12 drops. Also, excess air in chamber 76 is free to flow through pipe 23 back into the ground below slab 21. The air pressure in space 76 is substantially the same as ambient air pressure so that the air in space 76 does not effect the level of water in chamber 12.

While there has been shown and described a preferred embodiment of the animal drinker of the invention it is understood that changes in the structure, materials, and arrangement of the structure can be made by those skilled in the art without departing from the invention. The invention is defined in the following claims.

I claim:

1. An animal drinker comprising: tank means having generally upright wall means and bottom wall surrounding a chamber for accommodating water, said wall means having end walls with drinking well pockets open to the chamber and top of the end walls, top wall means mounted on the upright wall means covering said chamber, said top wall means having downwardly directed baffle means extended into the chamber and spaced inwardly from the upright wall means and above the bottom wall whereby water is located between the baffle means and upright wall means and in said pockets, said baffle means having a bottom edge located below the normal level of the water in the chamber and boss portions extended into the drinking well pockets providing the back walls of the drinking well pockets, means securing the top wall means to the upright wall means, means for supplying water to the chamber, said water flowing under the baffle means into said drinking well pockets, lid means for closing the drinking well pockets, and means pivotally connecting the lid means to the top wall means whereby the lid means normally close the top of said pockets and an animal can lift the lid means to provide access to the water in the drinking well pockets.

2. The drinker of claim 1 wherein: said tank means has an inner plastic shell, an outer plastic shell, and space between said shells, and foam plastic insulation means in said space.

3. The drinker of claim 1 wherein: the tank means is a one-piece seamless structure having an inner plastic shell, an outer plastic shell and a space between said shells made by a rotational molding process, and foam plastic insulation means filling the entire space between said shells.

4. The drinker of claim 1 wherein: said end walls each have first and second inside walls laterally spaced from each other on opposite sides of each pocket, each of said boss portions having upright surfaces located in surface engagement with said first and second inside walls to block the flow of air from the pocket into the chamber.

5. The drinker of claim 1 wherein: the top wall means including the baffle means and boss portions has an inner plastic shell, an outer plastic shell, and space between said shells and foam plastic insulation means in said space.

6. The drinker of claim 5 wherein: the inner and outer plastic shells are a seamless one piece structure made by a rotational molding process.

7. The drinker of claim 5 wherein: said end walls each have first and second inside walls laterally spaced from each other on opposite sides of each pocket, each of said boss portions having upright surfaces located in surface engagement with said first and second inside walls to block the flow of air from the pocket into the chamber.

8. The drinker of claim 1 wherein: said tank means has a first inner plastic shell, a first outer plastic shell, and space between said shells, foam plastic insulation means in said space, said top wall means including the baffle means and boss portion having second inner plastic shell, a second outer plastic shell, and space between said second shells, and foam plastic insulation means in the space between said second shells.

9. The drinker of claim 8 wherein: said tank means and said top wall means are seamless one piece structures made by a rotational molding process.

10. The drinker of claim 8 wherein: said end walls each have first and second inside walls laterally spaced from each other on opposite sides of the pocket, each of said boss portions having upright surfaces located in surface engagement with said first and second inside walls to block the flow of air from the pocket into the chamber.

11. An animal drinker comprising: tank means having generally upright wall means and a bottom wall surrounding a chamber for accommodating water, said wall means having an end wall with a drinking well pocket open to the chamber and top of the end wall, top wall means mounted on the upright wall means covering said chamber, said top wall means having downwardly directed baffle means extended into the chamber and spaced inwardly from the upright wall means and above the bottom wall whereby water is located between the baffle means and upright wall means and in said pocket, said baffle means having a bottom edge located below the normal level of the water in the chamber and a boss portion extended into the drinking well pocket, means securing the top wall means to the upright wall means, means for supplying water to the chamber, said water flowing under the baffle means into said drinking well pocket, lid means for closing the drinking well pocket and means movably connecting the lid means to the top wall means whereby the lid means normally closes the top of said pocket and an animal can lift the lid means to provide access to the water in the drinking well pocket.

12. The drinker of claim 11 wherein: said tank means has an inner plastic shell, an outer plastic shell, and space between said shells, and foam plastic insulation means in said space.

13. The drinker of claim 11 wherein: the tank means is a one-piece seamless structure having an inner plastic shell, an outer plastic shell and a space between said shells made by a rotational molding process, and foam plastic insulation means filling the entire space between said shells.

14. The drinker of claim 11 wherein: said end wall has first and second inside walls laterally spaced from each other on opposite sides of the pocket, said boss portion having upright surfaces located in surface engagement with said first and second inside walls to block the flow of air from the pocket into the chamber.

15. The drinker of claim 11 wherein: the top wall means has an inner plastic shell, an outer inner plastic shell, and space between said shells, and foam plastic insulation means in said space, and said tank means has an inner plastic shell, an outer plastic shell, and space between said shells, and foam plastic insulation means in said space.

16. The drinker of claim 15 wherein: said tank means and said top wall means are seamless one piece structures made by a rotational molding process.

* * * * *